(12) United States Patent
Sung

(10) Patent No.: US 8,949,911 B2
(45) Date of Patent: Feb. 3, 2015

(54) BROADCAST RECEIVING DEVICE TO REPORT PURCHASING INFORMATION AND A REPORTING METHOD THEREOF

(75) Inventor: Je-hun Sung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1494 days.

(21) Appl. No.: 11/781,980

(22) Filed: Jul. 24, 2007

(65) Prior Publication Data

US 2008/0196069 A1 Aug. 14, 2008

(30) Foreign Application Priority Data

Feb. 13, 2007 (KR) ........................ 10-2007-0014990

(51) Int. Cl.

| H04N 7/173 | (2011.01) |
|---|---|
| G06Q 30/06 | (2012.01) |
| H04N 21/41 | (2011.01) |
| H04N 21/422 | (2011.01) |
| H04N 21/472 | (2011.01) |
| H04N 21/478 | (2011.01) |

(52) U.S. Cl.
CPC ........... *H04N 7/17318* (2013.01); *G06Q 30/06* (2013.01); *H04N 21/4126* (2013.01); *H04N 21/42204* (2013.01); *H04N 21/47202* (2013.01); *H04N 21/47815* (2013.01)
USPC ............... 725/87; 725/61; 725/100; 725/110; 725/131; 725/139; 725/151

(58) Field of Classification Search
CPC .................. H04N 21/47815; H04N 21/42204; H04N 21/47202
USPC ..................................................... 725/60, 61
See application file for complete search history.

(56) References Cited

U.S. PATENT DOCUMENTS

| 5,172,413 | A | * | 12/1992 | Bradley et al. ................. 725/121 |
|---|---|---|---|---|
| 5,589,892 | A | * | 12/1996 | Knee et al. ..................... 725/43 |
| 5,927,544 | A | * | 7/1999 | Kanoh et al. .................... 221/90 |
| 6,539,282 | B2 | * | 3/2003 | Metcalf et al. ................ 700/237 |
| 7,310,810 | B1 | * | 12/2007 | Hamada et al. ................. 725/91 |
| 2003/0103088 | A1 | * | 6/2003 | Dresti et al. ................... 345/835 |
| 2003/0192051 | A1 | * | 10/2003 | Yuen .............................. 725/62 |
| 2004/0078340 | A1 | * | 4/2004 | Evans ............................ 705/64 |
| 2005/0091679 | A1 | * | 4/2005 | Tanaka et al. .................... 725/8 |
| 2006/0009195 | A1 | * | 1/2006 | Itoh .............................. 455/411 |

(Continued)

*Primary Examiner* — Nnenna Ekpo
(74) *Attorney, Agent, or Firm* — Staas & Halsey LLP

(57) ABSTRACT

A broadcast receiving device and a reporting method thereof are disclosed. If a request to purchase a pay service is received, a signal received from a remote control device within a preset reference time period is sensed before purchasing the pay service in order to determine whether the purchase is normal or abnormal, and a purchase questioning message according to the determined results is transmitted to a pre-registered contact number or an address of a user and a time display unit mounted on the broadcast receiving device. Therefore, if a pay service purchase request command is received, it is determined whether the purchase is normal or abnormal by sensing a signal received from the remote control device within the first reference time period set before conducting the purchase, and a purchase questioning message according to the determined results is transmitted to a user's pre-registered contact number or address and the display unit, which is mounted on the broadcast receiving device and displays the current time. Accordingly, loss resulting from abnormal purchases can be prevented and successive abnormal purchase can be eliminated.

26 Claims, 2 Drawing Sheets

(56) References Cited

U.S. PATENT DOCUMENTS

| | | | |
|---|---|---|---|
| 2006/0010072 A1* | 1/2006 | Eisen | 705/44 |
| 2006/0190350 A1* | 8/2006 | Maas | 705/26 |
| 2007/0288323 A1* | 12/2007 | Halevy | 705/26 |
| 2013/0024546 A1* | 1/2013 | Carhart et al. | 709/217 |

* cited by examiner

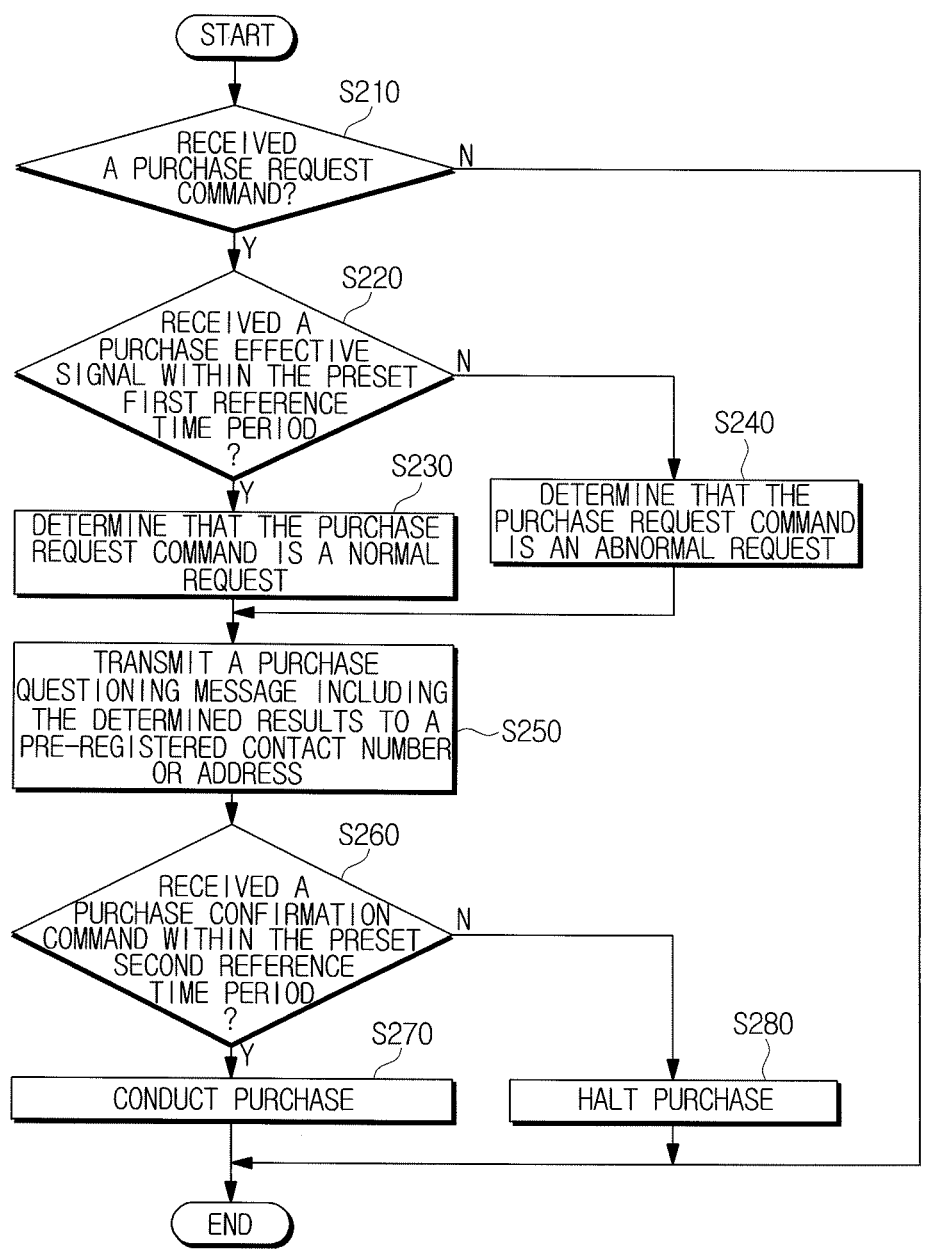

BROADCAST RECEIVING DEVICE TO REPORT PURCHASING INFORMATION AND A REPORTING METHOD THEREOF

CROSS-REFERENCE TO RELATED APPLICATIONS

This application claims priority under 35 U.S.C. §119(a) from Korean Patent Application No. 10-2007-0014990, filed in the Korean Intellectual Property Office on Feb. 13, 2007, the entire disclosure of which is incorporated herein in its entirety by reference.

BACKGROUND OF THE INVENTION

1. Field of the Invention

The present general inventive concept relates to a broadcast receiving device to report purchasing information and a reporting method thereof.

2. Description of the Related Art

Broadcast receiving devices are devices that receive digital satellite broadcasts, and convert digital or analog broadcasts received from the broadcast station, or image and audio signals input from a variety of external devices such as video players or DVD players, into TS signals, and transmit the signals to a display device. A set top box is a representative example of a broadcast receiving device, which is a device for connecting a television to external signal sources.

In general, a set top box supports an open cable standard, which has been adopted as a standard for South Korean digital cable broadcasts. A cable communication device according to the open cable standard may include either an Out of Band (OOB) format or DOCSIS set-top Gateway (DSG) format which combines Data Over Cable Service Interface Specification (DOCSIS) equipment with digital cable broadcast equipment, or may include both OOB and DSG formats. The OOB format is alternatively called the DVS 167/178 format.

A broadcast receiving device usually provides pay services such as video on demand (VOD) and impulse pay-per-view (IPPV) services, in which users can purchase content by paying money.

However, if there is a malicious program or code generated by hacking in a broadcast receiving device, pay services may be purchased by the malicious program or code regardless of the intention of a user to purchase such services. That is, a purchase execution signal generated by the malicious code is transmitted to a cable card, and the cable card purchases a pay service contained in the purchase execution signal from a provider of the pay service.

In addition, a conventional broadcast receiving device provides information about the purchase of the pay service on a television screen connected to the broadcast receiving device. Accordingly, if the user is absent from the vicinity of the television screen, the user cannot notice that a purchase is being made, so successive pay service purchasing may not be prevented.

SUMMARY OF THE INVENTION

The present general inventive concept provides a broadcast receiving device and a reporting method thereof, wherein if a request to purchase a pay service is received, a signal received from a remote control device within a preset reference time period is sensed before purchasing the pay service in order to determine whether the purchase is normal or abnormal, and a purchase questioning message according to the determined results is transmitted to a pre-registered contact number or address of a user and a time display unit mounted on the broadcast receiving device.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a broadcast receiving device, including a determination unit to determine whether a purchase effective signal is received from an external device within a preset first reference time period, and to determine whether a received purchase request command corresponds to a purchase that is a normal purchase or an abnormal purchase based on the determined results, and an operation control unit to transmit to a pre-registered contact number or an address a purchase questioning message informing whether the purchase is a normal purchase or an abnormal purchase, which is determined by the determination unit.

The determination unit may determine that the purchase request command is a normal purchase requested via a normal route if the purchase effective signal is received within the first reference time period from a point of time when the purchase request command is received by user manipulation, and the determination unit may determine that the purchase request command is an abnormal purchase requested via abnormal route if the purchase effective signal is not received within the first reference time period from the point of time when the purchase request command is received by the user manipulation.

The broadcast receiving device may include a display unit to output a current time, and the operation control unit may output the purchase questioning message to at least one of the display unit and the contact number or the address pre-registered by the user.

The determination unit may measure the time from a point of time when the operation control unit outputs the purchase questioning message, and the determination unit may determine whether a purchase confirmation command is received from the external device based on the measured time and a preset second reference time period, and the operation control unit may conduct or halt purchase of the requested service based on the determination results of the determination unit.

The operation control unit may conduct the purchase of the requested service if the determination unit determines that the purchase confirmation command is received within the second reference time period, and the operation control unit may halt the purchase of the requested service if the determination unit determines that the purchase confirmation command is not received within the second reference time period.

The operation control unit may conduct the purchase of the requested pay service if the determination unit determines that the purchase request command is a normal purchase, and the operation control unit may halt the purchase of the requested pay service if the determination unit determines that the purchase request command is an abnormal purchase.

The operation control unit may transmit the purchase questioning message to the contact number or the address using a program which supports at least one of telephone and message services through the Internet, and using at least one driver installed with the program.

The operation control unit may transmit the purchase questioning message to the contact number or the address using a voice over Internet protocol (VoIP).

The external device may be a remote control.

The foregoing and/or other aspects and utilities of the present general inventive concept may also be achieved by providing a reporting method of a broadcasting device, including determining whether a purchase effective signal is received from an external device within a preset first reference time period, and determining whether a received purchase request command corresponds to a purchase that is a normal purchase or an abnormal purchase based on the determined results, and transmitting to a pre-registered contact number or an address a purchase questioning message informing whether the purchase is a normal purchase or an abnormal purchase, which is determined at the determination operation.

In the determination operation, it is determined that the purchase request command is a normal purchase requested via a normal route if the purchase effective signal is received within the first reference time period from a point of time when the purchase request command is received by user manipulation, and it is determined that the purchase request command is an abnormal purchase requested via an abnormal route if the purchase effective signal is not received within the first reference time period from the point of time when the purchase request command is received by the user manipulation.

The method may further include outputting a current time, wherein in the control operation, the purchase questioning message is output to at least one of the display unit and the contact number or the address pre-registered by the user.

In the determination operation, time may be measured from a point of time when the operation control unit outputs the purchase questioning message in the control operation, and it is determined whether a purchase confirmation command is received from the external device based on the measured time and a preset second reference time period, and in the control operation, purchase of the requested service may be conducted or halted based on the determined results of the determination unit.

In the control operation, purchase of the requested service may be conducted if it is determined in the determination operation that the purchase confirmation command is received within the second reference time period, and the purchase of the requested service may be halted if it is determined that the purchase confirmation command is not received within the second reference time period.

In the control operation, the purchase of the requested pay service may be conducted if it is determined in the determination operation that the purchase request command is a normal purchase, and the purchase of the requested pay service may be halted if it is determined that the purchase request command is an abnormal purchase.

In the control operation, the purchase questioning message may be transmitted to the contact number or the address using a program which supports at least one of telephone and message services through the Internet and using at least one driver installed with the program.

In the control operation, the purchase questioning message may be transmitted to the contact number or the address using a voice over Internet protocol (VoIP).

The foregoing and/or other aspects and utilities of the general inventive concept may also be achieved by providing a broadcast receiving device, including a determination unit to determine whether a purchase request corresponds to a purchase that is a valid purchase and an operation control unit to transmit a purchase questioning message to a pre-registered contact number or an address including whether the purchase request has been determined to be a valid purchase request by the determination unit.

The foregoing and/or other aspects and utilities of the general inventive concept may also be achieved by providing a broadcast receiving device, including a determination unit to determine whether a purchase request corresponds to a valid purchase request or an invalid purchase request and an operation control unit to transmit a purchase confirmation request to request confirmation of whether the purchase request is one of the valid purchase request or the invalid purchase request as determined by the determination unit, wherein the operation control unit conducts or halts the purchase request based on a response to the purchase confirmation request and the determination result of the determination unit.

The foregoing and/or other aspects and utilities of the general inventive concept may also be achieved by providing a method of validating a purchase request of a broadcast receiving device, the method including determining whether the purchase request corresponds to a valid purchase request or an invalid purchase request, transmitting a purchase confirmation request to request confirmation of whether the purchase request is one of the valid purchase request or the invalid purchase request as determined by the determination unit and conducting or halting the purchase request based on a response to the purchase confirmation request and the determination result.

The foregoing and/or other aspects and utilities of the general inventive concept may also be achieved by providing a non-transitory computer-readable recording medium having embodied thereon a computer program to execute a method of a broadcast receiving device, wherein the method includes determining whether a purchase request corresponds to a valid purchase request or an invalid purchase request, transmitting a purchase confirmation request to request confirmation of whether the purchase request is one of the valid purchase request or the invalid purchase request as determined by the determination unit and conducting or halting the purchase request based on a response to the purchase confirmation request and the determination result.

The foregoing and/or other aspects and utilities of the general inventive concept may also be achieved by providing a broadcast receiving device, including an interface to receive a signal from an external device, a transmitter to transmit a signal to another external device, and a controller having a determination unit to determine whether a purchase effective signal is received from the external device within a preset first reference time period, and to determine whether a received purchase request command corresponds to a purchase that is a normal purchase or for an abnormal purchase based on the determined results, and an operation control unit to control the transmitter to transmit a pre-registered contact number or an address a purchase questioning message informing whether the purchase is a normal purchase or an abnormal purchase, which is determined by the determination unit.

BRIEF DESCRIPTION OF THE DRAWINGS

The above aspects and features of the present general inventive concept will be more apparent by describing certain embodiments of the present general inventive concept with reference to the accompanying drawings, in which:

FIG. 2 is a flow diagram illustrating an operation of a broadcast receiving device according to an embodiment of the present general inventive concept.

DETAILED DESCRIPTION OF THE PREFERRED EMBODIMENTS

Figure 1:
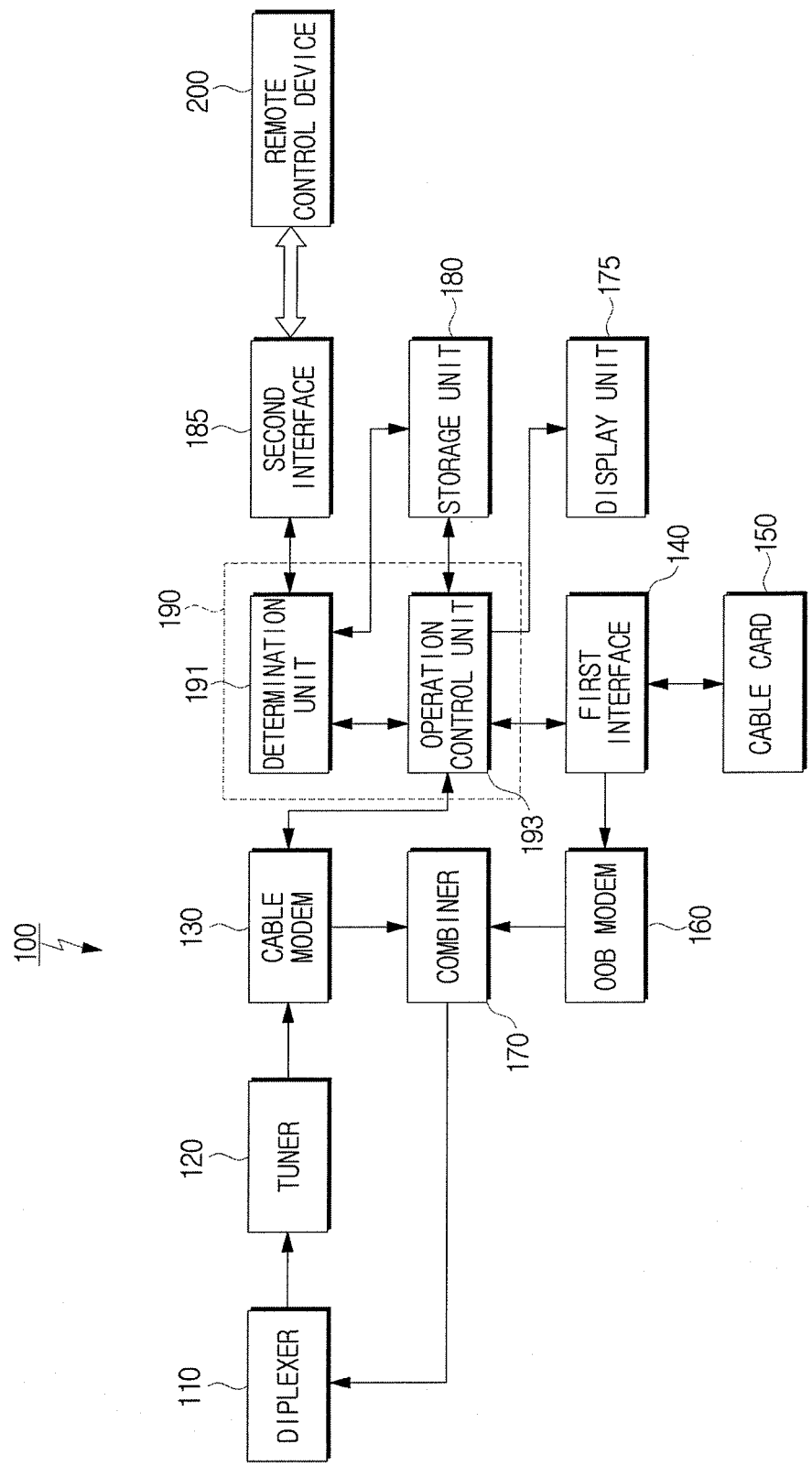
FIG. 1 is a block diagram illustrating a broadcast receiving device according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a broadcast receiving device according to an embodiment of the present general inventive concept. In FIG. 1, the broadcast receiving device includes a diplexer 110, a tuner 120, a cable modem 130, a first interface 140, a cable card 150, an Out of Band (OOB) modem 160, a combiner 170, a display unit 175, a storage unit 180, a second interface 185, and a controller 190.

The diplexer 110 is a branching filter element that simultaneously transmits or receives two signals having different frequencies. The diplexer 110 receives downstream data transmitted from a broadcast station and transmits upstream data to the broadcast station at the same time. The diplexer 110 is a combination of a high pass filter (HPF) and a low pass filter (LPF), and transmits two signals having different frequencies via a single channel or path.

The tuner 120 receives a broadcast signal corresponding to a channel selected by a user from a broadcast station.

The cable modem 130 transmits data bi-directionally, using a cable network. That is, the cable modem 130 transmits a downstream signal provided from the tuner 120 to a controller 190, and modulates and amplifies an upstream signal received from the controller 190.

The first interface 140 provides a communication interface between the broadcast receiving device 100 and the cable card 150 inserted in the broadcast receiving device 100.

That is, the first interface 140 transmits to the cable card 150 a purchase request signal corresponding to a pay service purchase request command received from the controller 190, and receives the pay service from the cable card 150. The first interface 140 transmits the purchase request signal to the cable card 150 using a specific application software (SAS) and an impulse pay per view (IPPV) resource monitor function. The SAS and IPPV functions are well-known technologies, so detailed description will be omitted for the sake of brevity.

The cable card 150 controls authentication of service subscribers and subscribers access to the service. In more detail, if the cable card 150 receives an encrypted broadcast signal through the tuner 110, the cable card 150 decodes and outputs the broadcast signal if the user has access to the received broadcast signal.

The OOB modem 160 modulates a digital signal received from the cable card 150 through the first interface 140 into an analog signal.

The combiner 170 combines signals input through various routes and outputs the signals to the diplexer 110. For example, the combiner 170 combines the modulated and amplified upstream signal from the cable modem 130 and the analog signal from the OOB modem 160.

The diplexer 110, the cable modem 130, the combiner 170, and the OOB modem 160 may constitute a transmitter to transmit a signal representing a purchase questioning message from the controller 190 to a designated address or location stored in the storage unit 180.

The display unit 175 outputs current time of the broadcast receiving device 100, and outputs the purchase questioning message received from the controller 190. The purchase questioning message informs whether the purchase is being conducted via a normal route or via an abnormal route.

The storage unit 180 stores programs necessary to control the operation of the broadcast receiving device 100, programs necessary to provide telephone or message services through the Internet, and a user's contact number or address pre-registered by a user. The programs necessary to provide telephone or message services through the Internet are used to transmit a purchase questioning message to the user's contact number or address, and one example of such a program is a voice over Internet protocol (VoIP) driver.

Furthermore, the storage unit 180 stores a preset first reference time period which is a reference to receive a purchase effective signal, and a preset second reference time period which is a reference to receive a purchase confirmation command.

The second interface 185 provides a communication interface to a remote control device 200 remotely connected to the broadcast receiving device 100 through an infrared sensor, and receives a purchase effective signal from the remote control device 200. A remote control is an example of the remote control device 200. The second interface 185 may be referred to as a remote control device signal receiver to receive signals transmitted from the remote control device 200.

The controller 190 controls data to be transmitted along a predetermined route according to a communication format of the broadcast receiving device 100 determined by communication with the cable card 150, determines whether a purchase request is normal or abnormal when receiving a purchase request command, and transmits a purchase questioning message to a contact number or address pre-registered by the user based on the determined results. The controller 190 includes a determination unit 191 and an operation control unit 193.

The determination unit 191 determines whether the communication format of the broadcast receiving device 100 is a DSG format or an OOB format by communication with the cable card 150, and outputs the determined results to the operation control unit 193. The method to determine the communication format of the broadcast receiving device 100 is a well-known technology, so detailed description will be omitted for the sake of brevity.

The determination unit 191 examines whether a purchase effective signal is received from the remote control device 200 within the preset first reference time period with reference to the storage unit 180 if a pay service purchase request command is received. The pay service purchase request command may be received by user manipulation of a manipulation unit (not illustrated) mounted on the broadcast receiving device 100 or the remote control device 200, or by malicious code generated by hacking.

The pay service is a service such as VOD or IPPV, which is provided by a service provider in exchange for payment by a user. An example of the purchase effective signal is a signal which is transmitted from the remote control device 200 to the broadcast receiving device 100 when a confirm button on the remote control device 200 is pressed by a user.

In addition, the determination unit 191 determines that the pay service purchase request command is a normal purchase requested via a normal route if a pay effective signal is received from the remote control device 200 through the second interface 185 within the preset first reference time period from the point of time when the pay service purchase request command is received.

However, the determination unit 191 determines that the pay service purchase request command is an abnormal purchase requested via an abnormal route if a pay effective signal is not received from the remote control device 200 within the preset first reference time period from the point of time when the pay service purchase request command is received. Subsequently, the determination unit 191 outputs the determined results to the operation control unit 193. The determination unit 119 may determine that the pay service purchase request command is received, according to identifying a signal received from the remote control device 200 through the second interface 185 or analyzing the signal to determine that the signal includes pay effective signal.

Furthermore, the determination unit 191 determines with reference to the storage unit 180 whether a purchase confirmation command is received within the preset second reference time period from the point of time when the operation control unit 193 outputs the purchase questioning message to the pre-registered contact number or address and the display unit 175. The purchase confirmation command may be received on pressing a confirmation button on the manipulation unit (not illustrated) mounted on the broadcast receiving device 100 or the remote control device 200.

The operation control unit 193 transmits data to the cable modem 130 if the determination unit 191 determines that the communication format of the broadcast receiving device 100 is the DSG format. Alternatively, the operation control unit 193 transmits data to the cable card 150 if the determination unit 191 determines that the communication format of the broadcast receiving device 100 is the OOB format.

Moreover, the operation control unit 193 transmits a purchase questioning message to the user's pre-registered contact number or address based on the determined results on purchase of the pay service received from the determination unit 191. The operation control unit 193 may also output the purchase questioning message to the display unit 175 mounted on the broadcast receiving device 100.

Specifically, the operation control unit 193 outputs the results of the determination received from the determination unit 191, that is, a purchase questioning message informing whether the purchase is a normal purchase or an abnormal purchase to the display unit 175, and transmits the purchase questioning message to the user's pre-registered contact number or address using a VoIP driver stored in the storage unit 180. The method of transmitting a message using a VoIP driver is a well-known technology, so detailed description will be omitted for the sake of brevity.

The operation control unit 193 transmits a purchase request signal corresponding to the purchase request command to the cable card 150 through the first interface 140 if the determination unit 191 determines that the purchase confirmation command is received within the second reference time period, and receives the requested pay service from the cable card 150.

Accordingly, the operation control unit 193 conducts the purchase of the requested pay service through communication with the cable card 150 and the service provider (not illustrated) using the first interface 140. Then, the cable card 150 receives the requested pay service through communication with the service provider (not illustrated) with which it is connected through the Internet.

The operation control unit 193 stops a purchase of the pay service if the determination unit 191 determines that the purchase confirmation command is not received within the second reference time period. The operation control unit 193 can output a purchase halt message indicating that the purchase of the pay service is halted to at least one of the display unit 175 and the pre-registered contact number or address.

FIG. 2 is a flow diagram illustrating an operation of a broadcast receiving device 100 (FIG. 1) according to an embodiment of the present general inventive concept. Referring to FIGS. 1 and 2, if a pay service purchase request command is received in operation S210:Y, the determination unit 191 determines whether a purchase effective signal is received within a preset first reference time period in operation S220.

More specifically, the determination unit 191 determines whether a purchase effective signal is received from the remote control device 200 within the preset first reference time period if a pay service purchase request command is received from the manipulation unit (not illustrated) on the broadcast receiving device 100 or from the remote control device 200 through the second interface 185 by a user. That is, the determination unit 191 measures the time from the point of time when the purchase request command is received, and determines whether a purchase effective signal is received within the preset first reference time period.

Subsequently, if it is determined that the purchase effective signal is received within the first reference time period in operation S220:Y, the determination unit 191 determines that the pay service purchase request command is a normal request requested via a normal route in operation S230. That is, the determination unit 191 determines that the received pay service purchase request command is requested by user manipulation.

Alternatively, if the purchase effective signal is not received within the first reference time period in operation S220:N, the determination unit 191 determines that the pay service purchase request command is an abnormal request requested in an abnormal route in operation S240. That is, the determination unit 191 determines that the received pay service purchase request command is requested by a malicious code such as a hacking program.

Subsequently, in operation S250, the operation control unit 193 transmits a purchase questioning message to a contact number or address pre-registered by a user based on the results determined by the determination unit 191. The operation control unit 193 may output the purchase questioning message to the display unit 175 mounted on the broadcast receiving device 100.

In more detail, the operation control unit 193 transmits to a pre-registered contact number or address the purchase questioning message including the contents of operation S230 or operation S240, which are the results determined in operation S220, and outputs the purchase questioning message to the display unit 175 which is mounted on the broadcast receiving device 100 and displays the current time. That is, the operation controller 193 outputs to at least one of the pre-registered contact number or address and the display unit 175 the purchase questioning message indicating whether the pay service is requested normally via a normal route or requested abnormally via an abnormal route.

The operation control unit 193 transmits the purchase questioning message to the pre-registered contact number or address using a pre-stored VoIP driver. The contact number or address which receives the purchase questioning message is pre-registered in the broadcast receiving device 100 by user manipulation of a manipulation unit (not illustrated) on the broadcast receiving device 100 and the remote control device 200. Whether or not to receive the purchase questioning message can be selected by a user.

In operation S260, the determination unit 191 determines whether a purchase confirmation command is received from the remote control device 200 within the preset second reference time period.

More specifically, the determination unit 191 measures the time from the point of time when the purchase questioning message is transmitted in operation S250, and determines whether the purchase confirmation command is received from the remote control device 200 within the preset second reference time period. The purchase confirmation command can be received on pressing a confirmation button on the manipulation unit (not illustrated) on the broadcast receiving device 100 or the remote control unit 200.

Next, if it is determined that the purchase confirmation command is received within the preset second reference time period in operation S260:Y, the operation control unit 193 receives the requested pay service in operation 270.

That is, the operation control unit 193 conducts the purchase of the requested pay service through communication with the cable card 150 and a service provider (not illustrated). The cable card 150 receives the requested pay service through communication with the service provider (not illustrated) with which it is connected through the Internet.

If it is determined that the purchase confirmation command is not received within the preset second reference time period in operation S260:N, the operation control unit 193 stops purchase of the pay service in operation 280. The operation control unit 193 may output a purchase halt message indicating that purchase of the pay service is halted to at least one of the display unit 175 and the contact number or address pre-registered by a user.

In a broadcast receiving device and a reporting method thereof according to the present general inventive concept, the operation control unit 193 stops displaying the current time being output on the display unit 175 and displays the purchase questioning message, or alternatively displays at least one of the current time and the purchase questioning message.

In a broadcast receiving device and a reporting method thereof according to the present general inventive concept, the operation control unit 193 is limited to transmitting the purchase questioning message using VoIP, but it is not necessarily limited thereto. The operation control unit 193 may transmit the purchase questioning message using a method of providing at least one of telephone and message services through the Internet and a device supporting this method.

The present general inventive concept can also be embodied as computer-readable codes on a non-transitory computer-readable medium. The non-transitory computer-readable medium can include a non-transitory computer-readable recording medium and a non-transitory computer-readable transmission medium. The non-transitory computer-readable recording medium is any data storage device that can store data that can be thereafter read by a computer system. Examples of the non-transitory computer-readable recording medium include read-only memory (ROM), random-access memory (RAM), CD-ROMs, magnetic tapes, floppy disks, and optical data storage devices. The non-transitory computer-readable recording medium can also be distributed over network coupled computer systems so that the computer-readable code is stored and executed in a distributed fashion. The non-transitory computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As can be appreciated from the above description, if a pay service purchase request command is received, it is determined whether the purchase is normal or abnormal by sensing a signal received from the remote control device within the first reference time period set before conducting the purchase, and a purchase questioning message according to the determined results is transmitted to a user's pre-registered contact number or address and the display unit, which is mounted on the broadcast receiving device and displays the current time. Accordingly, loss resulting from abnormal purchases can be prevented and successive abnormal purchase can be eliminated.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A broadcast receiving device, comprising:
a determination unit to determine whether a purchase effective signal is received from an external device within a preset first reference time period, and to determine whether a received purchase request command corresponds to a purchase that is a normal purchase or for an abnormal purchase based on the determined results; and
an operation control unit to transmit to a pre-registered contact number or an address a purchase questioning message informing whether the purchase is a normal purchase or an abnormal purchase, which is determined by the determination unit,
wherein the determination unit measures the time from a point of time when the operation control unit outputs the purchase questioning message, and the determination unit determines whether a purchase confirmation command is received from the external device based on the measured time and a preset second reference time period that is different from the preset first reference time period, and
wherein the operation control unit conducts or halts purchase of the requested service based on the determination results of the determination unit.

2. The device of claim 1, wherein:
the determination unit determines that the purchase request command is a normal purchase requested via a normal route if the purchase effective signal is received within the first reference time period from a point of time when the purchase request command is received by user manipulation; and
the determination unit determines that the purchase request command is an abnormal purchase requested via abnormal route if the purchase effective signal is not received within the first reference time period from the point of time when the purchase request command is received by the user manipulation.

3. The device of claim 1, further comprising:
a display unit to output a current time, wherein the operation control unit outputs the purchase questioning message to at least one of the display unit and the contact number or the address pre-registered by the user.

4. The device of claim 1, wherein:
the operation control unit conducts the purchase of the requested service if the determination unit determines that the purchase confirmation command is received within the second reference time period; and
the operation control unit halts the purchase of the requested service if the determination unit determines that the purchase confirmation command is not received within the second reference time period.

5. The device of claim 1, wherein:
the operation control unit conducts the purchase of the requested pay service if the determination unit determines that the purchase request command is a normal purchase; and the operation control unit halts the purchase of the requested pay service if the determination unit determines that the purchase request command is an abnormal purchase.

6. The device of claim 1, wherein the operation control unit transmits the purchase questioning message to the contact number or the address using a program which supports at least one of telephone and message services through the Internet, and using at least one driver installed with the program.

7. The device of claim 1, wherein the operation control unit transmits the purchase questioning message to the contact number or the address using a voice over Internet protocol (VoIP).

8. The device of claim 1, wherein the external device is a remote control.

9. A reporting method of a broadcasting receiving device, the method comprising:
   determining whether a purchase effective signal is received from an external device within a preset first reference time period, and determining whether a received purchase request command corresponds to a purchase that is a normal purchase or an abnormal purchase based on the determined results; and
   transmitting to a pre-registered contact number or an address a purchase questioning message informing whether the purchase is a normal purchase or an abnormal purchase, which is determined at the determination operation,
   wherein, in the determination operation, time is measured from a point of time when the operation control unit outputs the purchase questioning message in the control operation, and it is determined whether a purchase confirmation command is received from the external device based on the measured time and a preset second reference time period that is different from the preset first reference time period, and
   wherein, in the control operation, purchase of the requested service is conducted or halted based on the determined results of the determination unit.

10. The method of claim 9, wherein in the determination operation:
    it is determined that the purchase request command is a normal purchase requested via a normal route if the purchase effective signal is received within the first reference time period from a point of time when the purchase request command is received by user manipulation; and
    it is determined that the purchase request command is an abnormal purchase requested via an abnormal route if the purchase effective signal is not received within the first reference time period from the point of time when the purchase request command is received by the user manipulation.

11. The method of claim 9, further comprising:
    outputting a current time,
    wherein in the control operation, the purchase questioning message is output to at least one of the display unit and the contact number or the address pre-registered by the user.

12. The method of claim 9, wherein in the control operation:
    the purchase of the requested service is conducted if it is determined in the determination operation that the purchase confirmation command is received within the second reference time period; and
    the purchase of the requested service is halted if it is determined that the purchase confirmation command is not received within the second reference time period.

13. The method of claim 9, wherein in the control operation:
    the purchase of the requested pay service is conducted if it is determined in the determination operation that the purchase request command is a normal purchase; and
    the purchase of the requested pay service is halted if it is determined that the purchase request command is an abnormal purchase.

14. The method of claim 9, wherein in the control operation, the purchase questioning message is transmitted to the contact number or the address using a program which supports at least one of telephone and message services through the Internet and using at least one driver installed with the program.

15. The method of claim 9, wherein in the control operation, the purchase questioning message is transmitted to the contact number or the address using a voice over Internet protocol (VoIP).

16. A broadcast receiving device, comprising:
    a determination unit to determine whether a purchase request received in a preset first reference time period corresponds to a purchase that is a valid purchase; and
    an operation control unit to transmit a purchase questioning message to a pre-registered contact number or an address including whether the purchase request has been determined to be a valid purchase request by the determination unit,
    wherein the determination unit measures the time from a point of time when the operation control unit outputs the purchase questioning message, and the determination unit determines whether a purchase confirmation command is received from an external device based on the measured time and a preset second reference time period that is different from the preset first reference time period, and
    wherein the operation control unit conducts or halts purchase of the requested service based on the determination results of the determination unit.

17. A broadcast receiving device, comprising:
    a determination unit to determine whether a purchase request received in a preset first reference time period corresponds to a valid purchase request or an invalid purchase request; and
    an operation control unit to transmit a purchase confirmation request to request confirmation of whether the purchase request is one of the valid purchase request or the invalid purchase request as determined by the determination unit,
    wherein the determination unit measures the time from a point of time when the operation control unit outputs the purchase confirmation request, and the determination unit determines whether a purchase confirmation command is received from an external device based on the measured time and a preset second reference time period that is different from the preset first reference time period, and
    wherein the operation control unit conducts or halts the purchase request based on a response to the purchase confirmation request and the determination result of the determination unit.

18. The broadcast receiving device of claim 17, wherein the determination unit determines that the purchase request corresponds to the valid purchase request when a purchase effective signal is received within a predetermined first reference time period from a point of time when the purchase request is received by a user manipulation.

19. The broadcast receiving device of claim 18, wherein the determination unit determines that the purchase request corresponds to the invalid purchase request when the purchase effective signal is not received within the predetermined first reference time period from the point of time when the purchase request is received by the user manipulation.

20. The broadcast receiving device of claim 19, wherein the determination unit determines whether the response to the purchase confirmation request is a non-response based on the predetermined second reference time period.

21. The broadcast receiving device of claim 20, wherein the operation control unit halts the received purchase request when the response to the purchase confirmation request is the non-response.

22. The broadcast receiving device of claim 21, wherein the operation control unit conducts the purchase request when the determination result is that the purchase request is the valid purchase request and the response to the purchase confirmation request confirms the valid purchase request.

23. The broadcast receiving device of claim 22, wherein the operation control unit halts the purchase request when the determination result is that the purchase request corresponds to the invalid purchase request and the response to the purchase confirmation request is the non-response.

24. A method of validating a purchase request in a broadcasting receiving device, the method comprising:
    determining whether the purchase request received in a first preset reference time period corresponds to a valid purchase request or an invalid purchase request;
    transmitting a purchase confirmation request to request confirmation of whether the purchase request is one of the valid purchase request or the invalid purchase request as determined by a determination unit; and
    conducting or halting the purchase request based on a response to the purchase confirmation request and the determination result,
    wherein the determining includes measuring the time from a point of time when the purchase confirmation request is output, and determining whether the purchase confirmation command is received based on the measured time and a preset second reference time period that is different from the preset first reference time period.

25. A non-transitory computer-readable recording medium having embodied thereon a computer program to execute a method of a broadcast receiving device, wherein the method comprises:
    determining whether a purchase request received in a preset first reference time period corresponds to a valid purchase request or an invalid purchase request;
    transmitting a purchase confirmation request to request confirmation of whether the purchase request is one of the valid purchase request or the invalid purchase request as determined by the determination unit; and
    conducting or halting the purchase request based on a response to the purchase confirmation request and the determination result,
    wherein the determining includes measuring the time from a point of time when the purchase confirmation request is output, and determining whether the purchase confirmation command is received based on the measured time and a preset second reference time period that is different from the preset first reference time period.

26. A broadcast receiving device, comprising:
    an interface to receive a signal from an external device;
    a transmitter to transmit a signal to another external device; and
    a controller having a determination unit to determine whether a purchase effective signal is received from the external device within a preset first reference time period, and to determine whether a received purchase request command corresponds to a purchase that is a normal purchase or for an abnormal purchase based on the determined results, and an operation control unit to control the transmitter to transmit a pre-registered contact number or an address a purchase questioning message informing whether the purchase is a normal purchase or an abnormal purchase, which is determined by the determination unit,
    wherein the determination unit of the controller measures the time from a point of time when the operation control unit of the controller outputs the purchase questioning message, and the determination unit determines whether a purchase confirmation command is received from the external device based on the measured time and a preset second reference time period that is different from the preset first reference time period, and
    wherein the operation control unit of the controller conducts or halts purchase of the requested service based on the determination results of the determination unit.

* * * * *